(12) United States Patent
Ronk et al.

(10) Patent No.: US 9,835,239 B2
(45) Date of Patent: Dec. 5, 2017

(54) COMPOSITE GEARBOX HOUSING

(71) Applicant: General Electric Company, Schenectady, NY (US)

(72) Inventors: Warren Rosal Ronk, West Chester, OH (US); Gregory Carl Gemeinhardt, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 15/002,691

(22) Filed: Jan. 21, 2016

(65) Prior Publication Data

US 2017/0211682 A1    Jul. 27, 2017

(51) Int. Cl.
*F16H 57/04* (2010.01)
*F16H 57/032* (2012.01)
*B64C 27/12* (2006.01)

(52) U.S. Cl.
CPC ........... *F16H 57/032* (2013.01); *B64C 27/12* (2013.01); *F16H 57/0412* (2013.01)

(58) Field of Classification Search
CPC ........... F16H 57/032; F16H 2057/0325; F16H 57/0412; F16H 57/0415; F16H 57/0419; F01P 2050/20; B64C 27/12
See application file for complete search history.

(56) References Cited

U.S. PATENT DOCUMENTS

| | | | | |
|---|---|---|---|---|
| 6,981,805 B2 * | 1/2006 | Miller | .................. | G02B 6/4201 385/92 |
| 7,829,006 B2 * | 11/2010 | Aisenbrey | ........ | G06K 19/07749 264/328.1 |
| 7,847,658 B2 * | 12/2010 | Lyons | .................... | C08J 9/0066 333/202 |
| 8,466,221 B2 | 6/2013 | Prusty et al. | | |
| 8,657,716 B1 * | 2/2014 | Whyte | .................. | F16H 57/031 475/220 |
| 8,794,914 B2 | 8/2014 | Hommes et al. | | |
| 8,973,465 B2 | 3/2015 | Duong | | |
| 9,096,000 B2 | 8/2015 | Maliszewski et al. | | |
| 9,115,799 B2 | 8/2015 | Russ | | |
| 9,145,834 B2 | 9/2015 | Frost et al. | | |
| 9,162,398 B2 | 10/2015 | Thunhorst et al. | | |

* cited by examiner

*Primary Examiner* — Adam D Rogers
(74) *Attorney, Agent, or Firm* — General Electric Company; William Scott Andes

(57) ABSTRACT

A housing that includes a polymer, a reinforcing material, and a thermally conductive filler. A first housing component is defined by the polymer such that the reinforcing material and a thermally conductive filler are embedded within the polymer. The thermally conductive filler is configured such that heat can be passively conducted through the first housing component. The housing can be configured to be an aircraft gearbox housing.

20 Claims, 3 Drawing Sheets

US 9,835,239 B2

COMPOSITE GEARBOX HOUSING

BACKGROUND OF THE INVENTION

The present invention relates to aircraft engine gearboxes and more specifically to a housing for aircraft engine gearboxes that includes a polymeric composite material.

Aircraft components and aircraft engines require lightweight parts in order to be efficient. Conventionally, aircraft components are formed from metallic material such as aluminum and magnesium alloys. Substituting lighter-weight polymeric materials, such as thermoplastic or thermoset materials, for metallic materials in housings can result in lighter-weight and more efficient aircraft and aircraft components. In this regard, fiber reinforced composite polymeric materials can be used for some specialized applications that require a lighter-weight material.

One problem related to using conventional composite polymeric materials in the construction of aircraft engine gearbox housings is that they do not have suitable thermodynamic characteristics. Some gearboxes used in aircraft components must be configured for passive heat transfer in order to avoid overheating. In other words, heat must be conducted through the wall thickness of the gearbox housing from an interior surface to an exterior surface. The reinforcing fibers for conventional composite thermoplastic materials are generally not oriented to conduct heat in the desired direction even if they are thermally conductive. Instead they are generally oriented to provide the required strength and stiffness characteristics.

BRIEF DESCRIPTION OF THE INVENTION

This need is addressed by a gearbox housing formed of a polymeric composite material that is reinforced by a material such as a carbon fiber and includes thermally conductive filler operable to passively conduct heat from a first side of the housing to the second side of the house.

A housing that includes a polymer, a reinforcing material, and a thermally conductive filler. A first housing component is defined by the polymer such that the reinforcing material and the thermally conductive filler are embedded within the polymer. The thermally conductive filler is configured such that heat can be passively conducted through the first housing component.

A housing for an aircraft gearbox that includes a polymeric layer and a thermally conductive filler. A first housing component is defined by the polymer such that the thermally conductive filler is embedded within the polymer. The thermally conductive filler is configured such that heat can be passively conducted through the first housing component.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
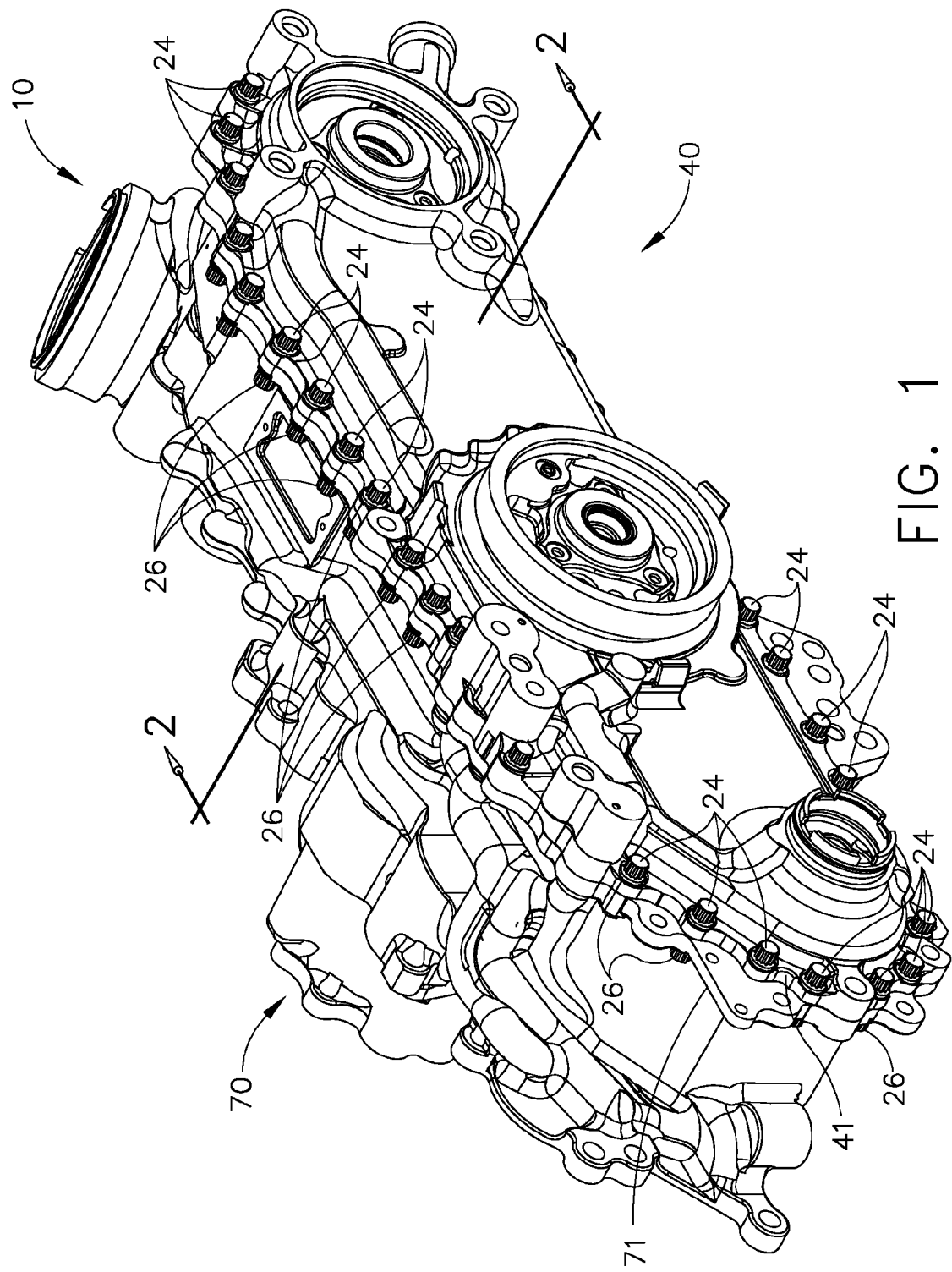
FIG. 1 is a perspective view of a gearbox housing that includes polymeric materials according to the present invention.

Referring to the drawings wherein identical reference numerals denote the same elements throughout the various views, FIG. 1 shows a housing 10 that includes a first housing component 40 and a second housing component 70. According to the illustrated embodiment, the housing 10 is an aircraft gearbox housing. The first housing component 40 is formed of a composite material where a polymer is reinforced with fibers as will be described further below. The second housing component 70 is formed of a conventional material for aircraft gearbox housings such as aluminum or a magnesium alloy.

Figure 2:
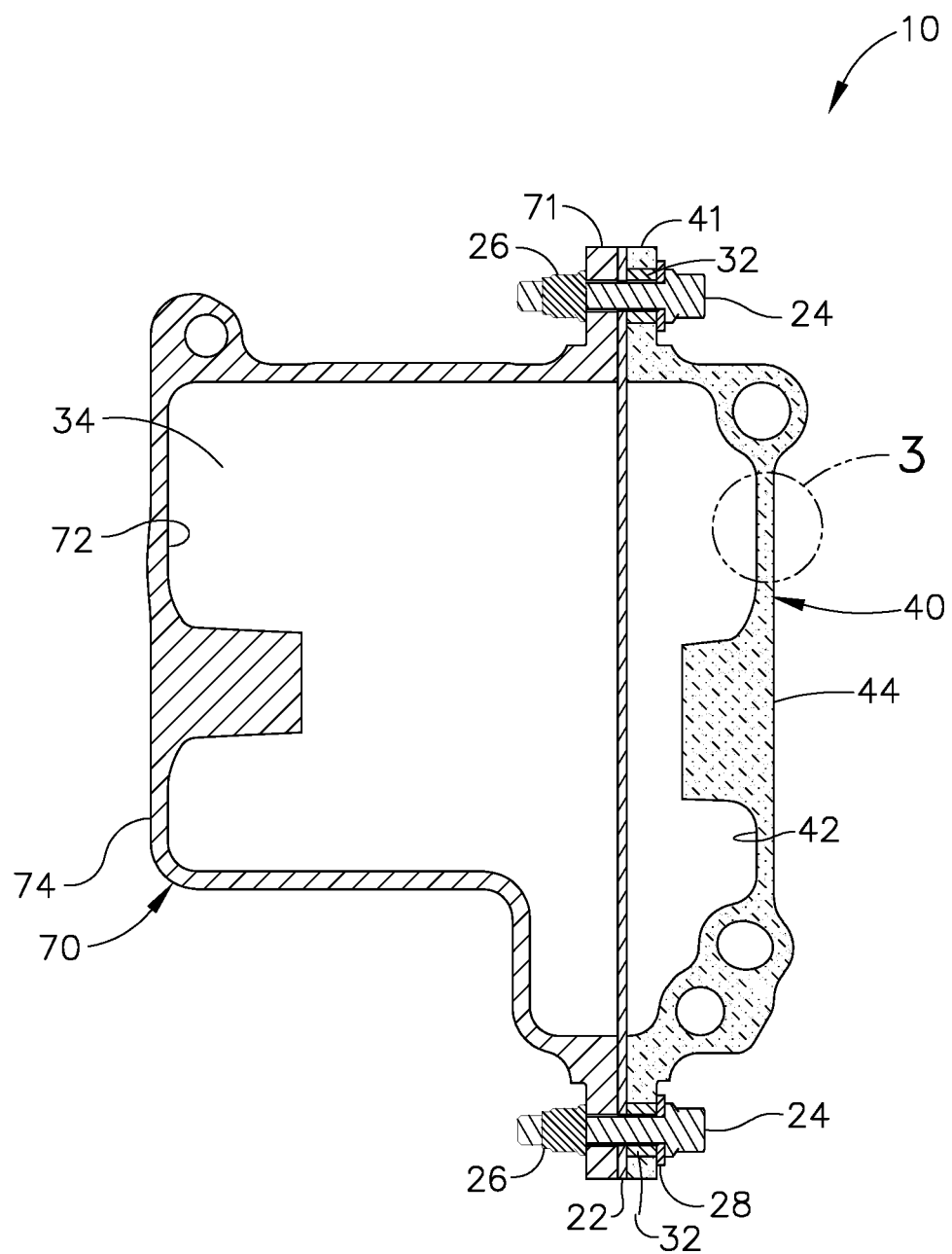
FIG. 2 is a cutaway side view of the a gearbox housing shown in FIG. 1 taken along line 2-2.

Referring now to FIGS. 1 and 2, the first housing component 40 and the second housing component 70 each include a flange 41 and 71, respectively. A gasket or seal 22 is sandwiched between the flanges 41 and 71. The seal 22 can be formed from a conventional gasket material. A plurality of conventionally threaded bolts 24 extend through corresponding holes that are formed in the flanges 41 and 71 and the seal 22. A threaded nut 26 is engaged with each of the bolts 24. In this manner, the first housing component 40 and the second housing component 70 are joined together to define the gearbox housing 10. It should be appreciated that other fastener systems can be used to join the first housing component 42 the second housing component 70.

A reinforcing plate or washer 28 is positioned between at least some of the nuts 26 and the flange 41. A reinforcing sleeve 32 is positioned to surround a portion of at least some of the bolts 24 in the section of the bolt that passes through the flange 41. It should be appreciated that the washers 28 and the reinforcing sleeves 32 are operable to protect the first housing component 40 from concentrated loads such as those associated with mechanical fasteners like bolts 24. Accordingly, when such connections are made, means to mitigate the concentrated loads can be used as shown. By way of example and not limitation, such mitigating means can include one of the following: sleeves, bushings, washers, plates, other load-spreading devices, and a combination thereof.

Referring now to FIG. 2, the first housing component 40 defines a first interior surface 42 and a first exterior surface 44. Likewise, the second housing component 70 defines a second interior surface 72 and a second exterior surface 74. Together, the first interior surface 42 and the second interior surface 72 define a chamber 34. The chamber 34 is configured to receive various fluids and mechanical components related to or associated with an aviation gearbox.

Figure 3:
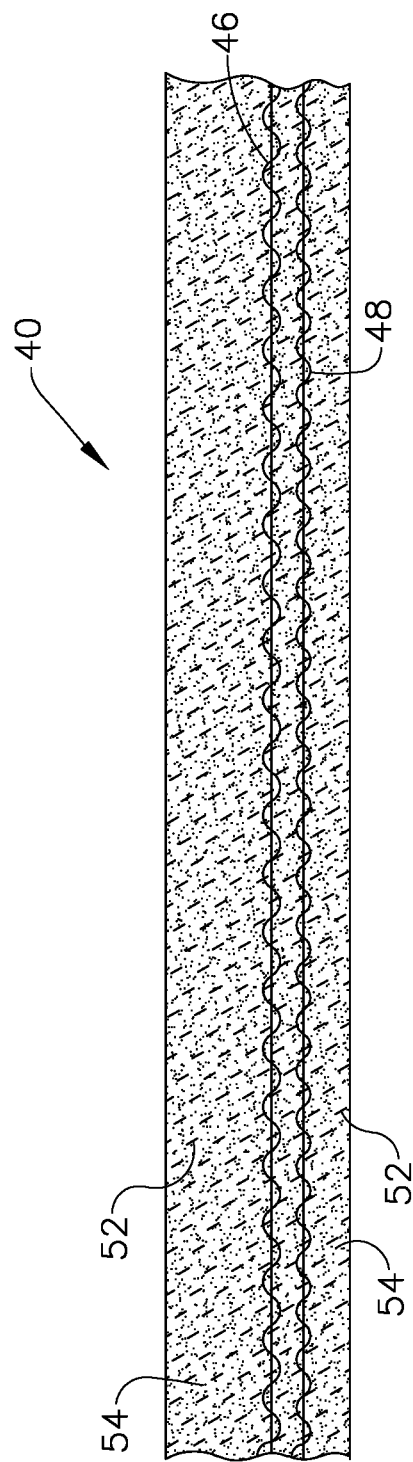
FIG. 3 is a cutaway detailed view of a section of the polymeric portion of gearbox housing shown in FIG. 2 taken at region 3.

Referring now to FIG. 3, the first housing component 40 includes a first reinforcing layer 46 and a second reinforcing layer 48. As shown, the first reinforcing layer 46 and the second reinforcing layer 48 are layers of fabric formed from woven carbon fibers. Additional reinforcing layers can be provided such that a substantial portion of the thickness of the first housing component 40 is comprised of reinforcing layers. By way of example and not limitation, the reinforcing material can be formed one of the following: chopped fibers, tape, fabric, continuous fibers, and a combination thereof. If chopped fibers are used, they are preferably greater than one half of an inch long. By way of example and not limitation, materials that can be used as the reinforcing material include one of the following: carbon, glass, and a combination thereof.

The first reinforcing layer 46 and the second reinforcing layer 48 are embedded in a polymeric matrix 52. The polymeric matrix is a polymer resin. By way of example and not limitation, the polymeric resin can be one of the following: epoxy, bismaleimide, benzoxazine, polyimide, polyaryletherketone, polyetherimide, polyamide-imide, polyphthalamide, polysialate, ceramic based composite, and a combination thereof.

Referring now to first housing component 40, it is generally configured to conduct heat from chamber 34 through first interior surface 42 to the first exterior surface 44. In this manner, heat is conducted through the first housing component 40 from the chamber 34 to the area around the first exterior surface 44. Likewise, heat must flow from the chamber 34 through the second interior surface 72 to the second exterior surface 74 of the second housing component 70 and thus to the area adjacent the second exterior surface 74.

To provide for the desired thermal conductivity characteristics of the first housing component 40, the polymeric matrix 52 is impregnated with conductive material such as thermally conductive filler 54. Thermally conductive filler 54 is used because it is generally difficult or impractical to orient the direction of the reinforcing carbon fibers of the first woven reinforcing layer 46 and the second woven reinforcing layer 48 so as to provide a direct heat transfer path in the "through-thickness" direction. Stated another way, it is difficult to orient the reinforcing layers to conduct heat from the first interior surface 42 to the first exterior surface 44 because they are also operable to provide reinforcement. In this regard, fibers of the first woven reinforcing layer 46 and the second reinforcing layer 48 are laid substantially perpendicularly to the desired heat transfer direction. If chopped fibers were used as the reinforcing material, it is believed that it would be difficult to control the distribution and orientation of the top fibers such that a sufficient direct heat transfer path is provided.

It is not necessary to have a continuous physical conduction path defined by thermally conductive filler 54 in order for sufficient heat to flow from chamber 34 to the exterior surface 34 and the region adjacent thereof. However, inclusion of thermally conductive filler 54 operates by providing a conduction path and not by changing the basic chemistry of the composite system where the composite system of the first housing component 40 includes the polymeric matrix 52, the first woven reinforcing layer 46, the second woven reinforcing layer 48, and the thermally conductive filler 54.

Thermally conductive filler 54 is chosen such that it can be physically distributed within a space or within the polymeric matrix 52 in a manner similar to a powder or a fluid. Thus, the thermally conductive filler 54 is able to be distributed evenly through the composite material and to fill in voids between the reinforcing material such as the first woven reinforcing layer 46 and the second woven reinforcing layer 48. Suitable materials for thermally conductive filler 54 can include carbon nano-fibers and carbon nanotubes. Carbon nanotubes are small cylinders or rods that have hemispherical ends and are very uniform. Carbon nano-fibers are less uniform than carbon nanotubes. As used herein, the term "nano" refers to a structure where one of the primary dimensions is on the order of 1 nanometer (nm) long.

The thermally conductive filler 54 can also function to reduce micro-cracking in the polymer matrix. Such cracking is generally caused by thermal stresses and degradation of the polymeric matrix. Cracks formed in this manner can lead to pathways from the first interior surface 42 to the first exterior surface 44. Such pathways would lead to possible leaking of fluid contents of the gearbox housing 10 such as oil.

Thermally conductive filler 54 can be formed of a metallic alloy, however this would not achieve the goal of reducing weight. By way of example and not limitation, thermally conductive filler 54 can be chosen from one of the following: carbon nano fibers, carbon nanotubes, a metallic alloy in powder form, zinc oxide, alumina, boron nitrides, carbon black, and a combination thereof.

It should be appreciated that the coefficient of thermal expansion "CTE" of the polymeric matrix 52 and thus first housing component 40 must be similar to that of the second housing component 70. Second housing component 70 is formed of a metallic material such as aluminum, magnesium alloy, steel, or other suitable metal or alloy. It should be appreciated that in some embodiments, the second housing component 70 is formed of a polymeric composite reinforced in the manner described in association with first housing component 40 above. Thus substantially all of a gearbox housing can be formed of a reinforced polymeric material.

Referring now to the construction of gearbox housing 10 and more specifically to the construction of the first housing component 40, it could be made in the molding process using hard tooling. Generally, the uncured polymeric matrix 52 along with the first woven reinforcing layer 46 and the second woven reinforcing layer 48 and the thermally conductive filler 54 would be loaded within a mold, the mold closed, and the composite system cured. Generally heat and time would be used to cure the composite system. Alternatively, polymeric matrix 52 and reinforcing fibers and thermally conductive filler 54 can be formed into a homogenous mixture prior to be added to the mold and cured to form first housing component 40.

The foregoing has described polymeric material having the thermal and structural properties sufficient to form an aircraft gearbox housing and a gearbox housing formed therefrom. The material is lighter than conventional materials and configured to conduct heat passively such that heat within the gear box housing can be conducted through the housing wall to an area outside of the housing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. A gearbox housing, the gearbox housing comprising:
   a first housing component;
   a polymer;
   a reinforcing material;
   a thermally conductive filler; the reinforcing material and the thermally conductive filler are embedded within the polymer;

the first housing component comprising the polymer;
wherein the thermally conductive filler permits heat to be passively conducted through the first housing component, and
wherein the reinforcing material comprises a fabric comprising carbon fiber.

2. The gearbox housing according to claim 1, wherein the first housing component has a first side and a second side and the thermally conductive filler is configured to provide a thermally conductive path such that heat can be passively conducted from the first side to the second side.

3. The gearbox housing according to claim 2, wherein the thermally conductive path is not continuous.

4. The gearbox housing according to claim 2, wherein the thermally conductive filler comprises carbon nanotubes.

5. The gearbox housing according to claim 2, wherein the thermally conductive filler comprises carbon nano-fibers.

6. The gearbox housing according to claim 2, wherein the thermally conductive filler comprises chopped fibers.

7. The gearbox housing according to claim 1, wherein the first housing component is joined to a second housing component.

8. The gearbox housing according to claim 7, wherein the second housing component comprises a metal.

9. The gearbox housing according to claim 7, wherein the second housing component comprises at least one of a polymer, a reinforcing material, and a thermally conductive filler.

10. A gearbox housing, the gearbox housing comprising:
a polymer;
a reinforcing material;
a thermally conductive filler;
a first housing component defined by the polymer such that the reinforcing material and the thermally conductive filler are embedded within the polymer;
wherein the thermally conductive filler is configured such that heat can be passively conducted through the first housing component, and
wherein the gearbox housing is an aircraft gearbox housing.

11. The gearbox housing according to claim 10, wherein the first housing component comprises a first flange and is joined to a second housing component, and
wherein the second housing component comprises a second flange and comprises a metal.

12. The gearbox housing according to claim 11 further comprising:
a gasket sandwiched between the first and second flanges;
a threaded bolt extending through one or more holes in each of the first and second flanges,
a threaded nut engaging the threaded bolt, and
a reinforcing sleeve positioned to surround a portion of the bolt,
wherein the first housing component and the second housing component are joined together to form the gearbox housing.

13. The gearbox housing according to claim 12,
the first housing component further comprising:
a first interior surface; and
a first exterior surface;
the second housing component further comprising:
a second interior surface; and
a second exterior surface;
wherein the first interior surface and the second interior surface form a chamber, and
wherein the chamber receives fluids and one or mechanical components of an aviation gearbox.

14. A gearbox housing for an aircraft gearbox, the gearbox housing comprising:
a polymer;
a thermally conductive filler;
a first housing component defined by the polymer such that the thermally conductive filler is embedded within the polymer,
wherein the thermally conductive filler is configured such that heat can be passively conducted through the first housing component,
wherein the first housing component has a first side and a second side and the thermally conductive filler is configured such that heat can be passively conducted from the first side to the second side, and
wherein the thermally conductive filler comprises carbon nanotubes.

15. The gearbox housing for an aircraft gearbox according to claim 14, wherein the thermally conductive filler comprises carbon nano-fibers.

16. The gearbox housing for an aircraft gearbox according to claim 14, wherein the thermally conductive filler comprises chopped fibers.

17. The gearbox housing for an aircraft gearbox according to claim 14, wherein the thermally conductive filler is positioned to provide a thermally conductive path.

18. The gearbox housing for an aircraft gearbox according to claim 17, wherein the thermally conductive path is not continuous.

19. The gearbox housing for an aircraft gearbox according to claim 14, the gearbox housing further comprising a reinforcing material.

20. The gearbox housing for an aircraft gearbox according to claim 19, wherein the reinforcing material is a fabric comprising carbon fiber.

* * * * *